Aug. 2, 1932.          C. H. HILL          1,870,047
              ELECTRICAL SWITCH GEAR
                Filed Oct. 9, 1930
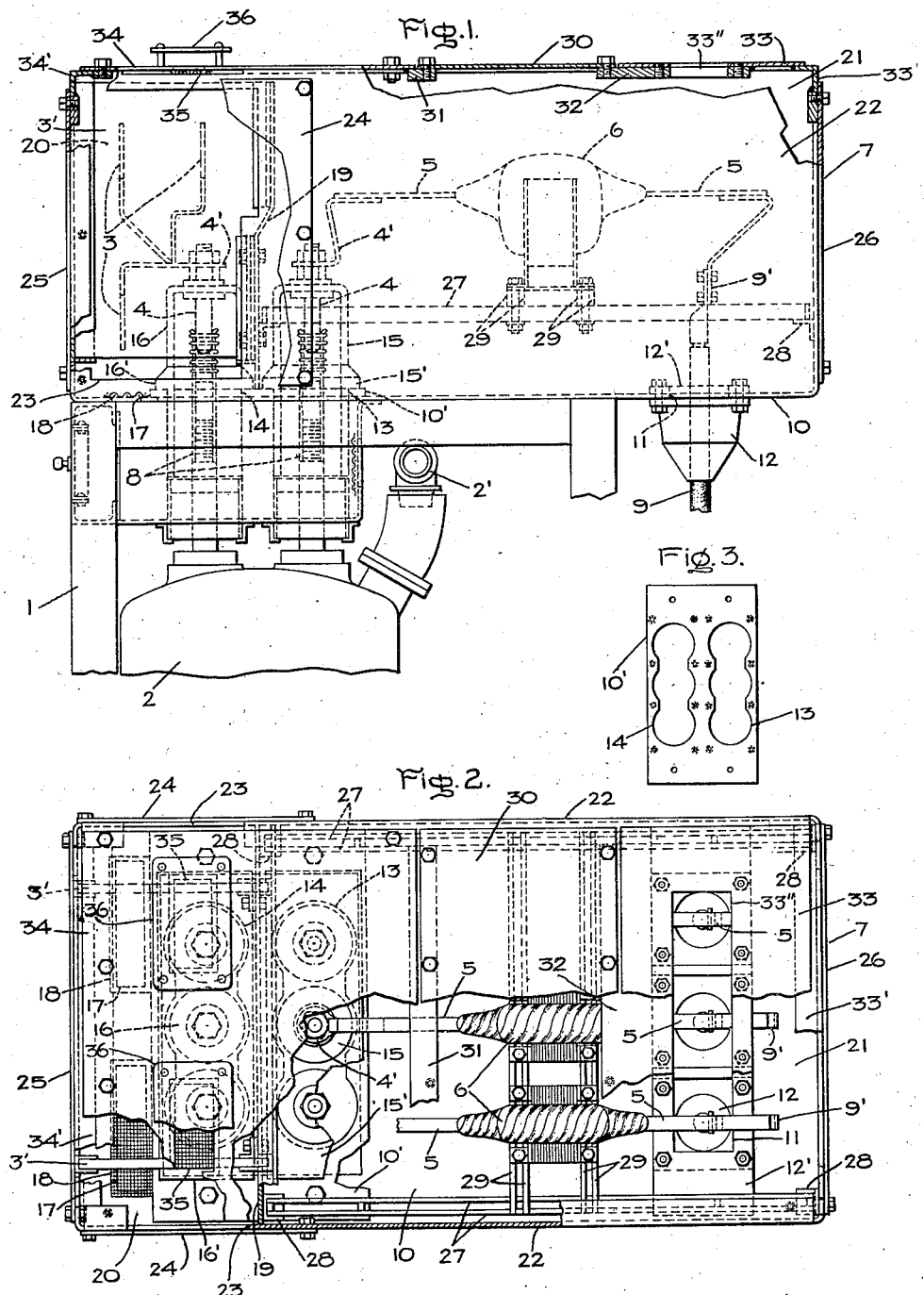
Inventor:
Charles H. Hill,
by Charles T. Tullar
His Attorney.

Patented Aug. 2, 1932

1,870,047

UNITED STATES PATENT OFFICE

CHARLES H. HILL, OF DREXEL HILL, PENNSYLVANIA, ASSIGNOR TO GENERAL ELECTRIC COMPANY, A CORPORATION OF NEW YORK

ELECTRICAL SWITCH GEAR

Application filed October 9, 1930. Serial No. 487,532.

My invention relates to electrical switchgear and more particularly to housing and mounting structure for the busses and other stationary apparatus generally comprising the superstructure of the drop-down type of metal clad switchgear.

The superstructure of indoor metal clad switchgear including a movable drop-down switch unit has in previous constructions included a trough-like sectional metallic housing for the busses and a separate metallic housing for the current transformers and other apparatus, the housings being individually mounted on the top of the stationary frame within which the movable switch unit is lowered and elevated with respect to the staionary disconnecting contacts connected to the busses and conductor leads within said housings. This construction involves considerable time and expense in manufacture and assembly and moreover is not always readily accessible from the viewpoint of inspection and repair.

The principal object of my invention is the provision of an improved superstructure for indoor metal clad switchgear of the dropdown type which shall be simple, compact and rugged in construction, arranged for ready access to all parts of the interior thereof and which may be manufactured and assembled at low cost.

My invention will be more fully set forth in the following description referring to the accompanying drawing, and the features of novelty which characterize my invention will be pointed out with particularity in the claims annexed to and forming a part of this specification.

Referring to the drawing, Fig. 1 is an elevational fragmentary view, partly broken away, showing the superstructure of metal clad switchgear embodying my invention, Fig. 2 is a top view, partly broken away, of the superstructure illustrated in Fig. 1 and Fig. 3 is a detailed view of a portion of the superstructure.

The indoor type of metal clad switchgear partly shown in Fig. 1 comprises a fixed supporting frame 1 having mounted therein for vertical movement a switch unit 2 comprising an oil circuit breaker. The circuit breaker as shown is in the elevated or connected position with respect to the electrical circuits associated therewith, the stationary portions of the circuits including the busbars 3, the stationary disconnecting contacts 4, and the leads 5 each including a current transformer 6, all comprised within a superstructure 7 mounted on and supported by the frame 1 in a manner hereinafter described. The movable switch unit 2 is provided with isolating or disconnecting contacts 8 movable therewith for coaction with the stationary disconnecting contacts 4 in a well known manner. With the circuit breaker in the connected or operative position shown, the circuit of each phase is completed from a busbar 3, through the circuit breaker 2, which in the present instance is a three-phase breaker, to the current transformer 6 and the outgoing feeder cable 9. The circuit breaker is likewise provided with a gas venting arrangement for venting the gas from the switch tank to an exhaust conduit 2' during operation thereof. The arrangement above described comprises a single metal clad unit which may readily be connected to similar units arranged in a row.

The superstructure 7 embodying my invention comprises a sheet metal housing which may be formed in general by a sheet metal blank cut to a desired pattern for forming the sides and end portions by bending, and welding parts of the blank to form a generally rectangular boxlike structure. The unit so formed comprises a bottom portion 10 having an elongated rectangular opening 11 at its rearward end overhanging or mounted above the frame 1 through which the individual phase cables 9, supported by the cable entrance bushings 12, may extend. A bushing supporting plate 12' having a rectangular opening in registry with the opening 11 is secured as by tack welding to the bottom portion 10. At the forward end of the bottom 10 is a rectangular opening over which is mounted, as by tack welding, the plate 10' having the elongated apertures 13 and 14 (Fig. 3) through which the insulating shields 15 and 16 extend respectively. The shields 15, which are cylindrical in form and open at their lower ends, are secured to the bottom plate 10' by the supporting plates 15' and 16' and extend downwardly as shown for receiving the movable disconnecting contacts 8 which coact with the stationary contacts 4 mounted at the upper closed ends of the shields.

The superstructure 7 may be filled with suitable insulating fluid or liquid when desired for insulating the electrical conductors and apparatus with respect to the enclosing metal housing, which is usually grounded, the character of the insulating fluid depending of course on the voltage of the circuits employed. In the present instance the insulating medium is air which is permitted to circulate around the busbars 3 by reason of the apertures 17 located in the front portion of the bottom 10, the apertures being covered by screening 18 which is tack welded or otherwise fastened to the bottom structure.

For the purpose of electrically isolating the busbars 3 with respect to the current transformers 6 and other parts of the circuit, the superstructure housing is provided with a metallic partition or barrier 19 which is preferably welded to the sides and bottom plate 10' of the housing between the apertures 13 and 14, forming therein a busbar compartment 20 and a transformer compartment 21. At opposite ends of the busbar compartment are suitably mounted barriers 3' for supporting the busbars 3 which extend therethrough. The side walls of the superstructure 7 comprise sheet metal portions 22 each having a rectangular opening 23 opposite the busbar compartment to which is fitted a removable cover member 24 for permitting access to the busbar compartment from the side and for extending the busbars to connect with the corresponding phases of similar adjacent units. The front portion of the busbar compartment is likewise provided with a removable cover 25 for permitting ready access thereto and the rear of the current transformer compartment 21 is provided with a similar removable cover 26.

For the purpose of mounting and supporting the current transformers 6 there are provided metallic strips 27 extending along the side walls 22 and welded to the angle supporting members 28 which are spaced with respect to the bottom 10. Secured to the supporting strips 27 as by welding are the spaced crossbars 29 extending transversely of the housing and forming a support for the bases of the current transformers which are bolted thereon in the manner illustrated in Fig. 2. The current transformers are readily accessible by reason of the removable cover 30 supported by transverse strips 31 and 32 forming part of the top of the structure. The cover structure is completed by the plate 33, supported by the transverse strips 32 and 33', which gives access to the cable lead-in conductors 9' and the forward removable top cover member 34, supported by the transverse strips 31 and 34', giving access to both the busbar compartment and current transformer compartment, including the connections 4' to the stationary disconnecting contacts. In case the cables 9 are to be brought into the compartment from the top, instead of from the bottom as shown, the plate 33 is provided with an aperture 33'' through which the cables may extend. When not in use, the aperture 33'' may be closed by a removable cover which is interchangeable with respect to both the upper and lower cable openings. The cover member 34 is likewise provided with ventilators, as apertures, above the busbar compartment for aiding the circulation of air within the compartment, the apertures being covered by the screening 35. A shielding member 36 is mounted on the cover member above each of the apertures for preventing injury or obstruction of the screening.

In assembling the apparatus, the insulating shields 15 and 16 for supporting the stationary disconnecting contacts 4 are clamped in position on opposite sides of the barrier 19 by the flange-like supporting plates 15' and 16' so that the lower ends of the shields extend through the apertures 13 and 14 respectively and below the bottom of the superstructure. The bus sections 3 supported by the barriers 3' are individually connected to the corresponding shields 16 at 4' and the current transformers are adjustably mounted on the cross supporting strips 29 so that exact alinement of the terminals 4' with respect to the cable connections 9' is not necessary.

The present arrangement, therefore, comprises a compact and readily accessible metal clad superstructure wherein the live parts are enclosed within a grounded metallic casing, the individual units being so arranged that they may be readily connected to similar units in a distribution system wherein a bank of switches controls the connections between feeder circuits and main busses.

It shall be understood that my invention is not limited to specific details of construction and arrangement thereof herein illustrated, and that changes and modifications may occur to one skilled in the art without departing from the spirit of my invention.

What I claim as new and desire to secure by Letters Patent in the United States is:

1. In metal clad switchgear including a supporting frame and a switch unit having disconnecting contacts vertically movable therein to connected and disconnected positions, a superstructure mounted on said frame comprising a unitary sheet metal housing having a metallic isolating partition for dividing the same into compartments including a bus bar compartment, said compartments having apertures in the bottom wall thereof on opposite sides of said partition and said bus bar compartment provided with removable cover structure at opposite ends thereof, and insulating shields supporting fixed disconnecting contacts mounted in and extending through said apertures, said fixed disconnecting contacts being connected to busbars in said bus bar compartment and to electrical conductors in another of said compartments.

2. In metal clad switchgear including a supporting frame and a switch unit having disconnecting contacts vertically movable therein to connected and disconnected positions, a superstructure mounted on and overhanging said frame comprising a unitary sheet metal housing having a metallic isolating partition for dividing the same into compartments, one of said compartments housing busbars and the other of said compartments housing current transformers and feeder cable connections, disconnecting contacts disposed on opposite sides of said partition for coacting with said movable disconnecting contacts through the lower walls of said compartments, and supporting means for said feeder cable connections mounted in the overhanging bottom wall structure of said housing.

3. In metal clad switchgear including a supporting frame and a switch unit having disconnecting contacts vertically movable therein to connected and disconnected positions, a superstructure mounted on said frame comprising a unitary sheet metal housing having a metallic isolating partition for dividing the same into a busbar compartment and a current transformer compartment, the apparatus in said compartments being air insulated with respect to the individual phases and the enclosing metallic housing, fixed disconnecting contacts disposed within each of said compartments and connected to the apparatus therein respectively, said housing having apertures in the lower walls of each of said compartments for receiving the movable disconnecting contacts, and ventilating means for said busbar compartment comprising screened apertures disposed in the top and bottom walls thereof.

4. Superstructure for metal clad switchgear of the drop-down type including a supporting frame and a switch unit having disconnecting contacts vertically movable therein to connected and disconnected positions, comprising a unitary sheet metal housing having a metallic isolating partition for dividing the same into a busbar compartment and a current transformer compartment, fixed disconnecting contacts disposed in each of said compartments and in registry through apertures in the bottom walls of said compartments with said movable disconnecting contacts, said busbar compartment having apertures in the side walls thereof for permitting inspection and extension of the busbars therein, removable cover members for said apertures, a removable cover member forming part of the top of said housing for permitting access to both of said compartments including the connections to the fixed disconnecting contacts, and removable cover structure for permitting access to the current transformers and connections thereto in said transformer compartment.

5. Superstructure for metal clad switchgear of the drop-down type including a supporting frame and a switch unit having disconnecting contacts vertically movable therein to connected and disconnected positions, comprising a unitary sheet metal housing having a metallic isolating partition for dividing the same into a busbar compartment and a current transformer compartment, fixed disconnecting contacts disposed in said compartments and connected to the respective phase conductors, said compartments having apertures in the lower walls thereof through which said movable disconnecting contacts engage said fixed contacts, the disconnecting contacts in said transformer compartment being individually connected to current transformers, and mounting means for said transformers comprising supporting strips mounted along opposite sides of and spaced from the bottom of said housing, and transverse bars mounted on said strips on which said current transformers are adjustably mounted.

6. Superstructure for metal clad switchgear of the drop-down type including a supporting frame and a switch unit having disconnecting contacts vertically movable therein to connected and disconnected positions with respect to said superstructure, comprising a unitary sheet metal housing having a metallic isolating partition for dividing the same into a busbar compartment and a current transformer compartment, a rectangular aperture in the lower wall of said transformer compartment through which phase feeder cables extend, a supporting plate having an aperture in registry with said rectangular aperture for supporting entrance bushings of said cables, said bottom wall of the housing having also a rectangular aperture extending on opposite sides of said partition, and a supporting plate mounted over said aperture, said plate being provided with apertures disposed on opposite sides of said partition through which extend insulating shields coacting with said disconnecting contacts.

In witness whereof, I have hereunto set my hand this 7th day of October, 1930.

CHARLES H. HILL.

DISCLAIMER 1,870,047.—*Charles H. Hill*, Drexel Hill, Pa. ELECTRICAL SWITCH GEAR. Patent dated August 2, 1932. Disclaimer filed July 27, 1935, by the assignee, *General Electric Company*.

Hereby enters this disclaimer to that part of the claims in the specification of said Letters Patent which is in the following words, to wit:

"1. In metal clad switchgear including a supporting frame and a switch unit having disconnecting contacts vertically movable therein to connected and disconnected positions, a superstructure mounted on said frame comprising a unitary sheet metal housing having a metallic isolating partition for dividing the same into compartments including a bus bar compartment, said compartments having apertures in the bottom wall thereof on opposite sides of said partition and said bus bar compartment provided with removable cover structure at opposite ends thereof, and insulating shields supporting fixed disconnecting contacts mounted in and extending through said apertures, said fixed disconnecting contacts being connected to bus bars in said bus bar compartment and to electrical conductors in another of said compartments.

"2. In metal clad switchgear including a supporting frame and a switch unit having disconnecting contacts vertically movable therein to connected and disconnected positions, a superstructure mounted on and overhanging said frame comprising a unitary sheet metal housing having a metallic isolating partition for dividing the same into compartments, one of said compartments housing bus bars and the other of said compartments housing current transformers and feeder cable connections, disconnecting contacts disposed on opposite sides of said partition for coacting with said movable disconnecting contacts through the lower walls of said compartments, and supporting means for said feeder cable connections mounted in the overhanging bottom wall structure of said housing."

[*Official Gazette August 20, 1935.*]